(12) United States Patent
Nakano et al.

(10) Patent No.: US 9,845,089 B2
(45) Date of Patent: Dec. 19, 2017

(54) CONTROL DEVICE AND CONTROL METHOD FOR A HYBRID VEHICLE

(71) Applicant: Mitsubishi Electric Corporation, Tokyo (JP)

(72) Inventors: Kotaro Nakano, Tokyo (JP); Keiichi Enoki, Tokyo (JP); Nobuhide Mori, Tokyo (JP); Hiroyuki Kobayashi, Hyogo (JP); Yasufumi Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 242 days.

(21) Appl. No.: 14/768,262

(22) PCT Filed: Apr. 23, 2013

(86) PCT No.: PCT/JP2013/061880
§ 371 (c)(1),
(2) Date: Aug. 17, 2015

(87) PCT Pub. No.: WO2014/174588
PCT Pub. Date: Oct. 30, 2014

(65) Prior Publication Data
US 2015/0360676 A1 Dec. 17, 2015

(51) Int. Cl.
*B60W 20/14* (2016.01)
*B60W 20/00* (2016.01)
(Continued)

(52) U.S. Cl.
CPC ......... *B60W 20/1062* (2013.01); *B60K 6/48* (2013.01); *B60K 6/547* (2013.01); *B60L 11/14* (2013.01);
(Continued)

(58) Field of Classification Search
CPC ......... B60W 10/113; B60W 30/18127; B60W 20/14; B60W 10/02; B60W 20/1062; B60W 10/08; Y10T 477/26
See application file for complete search history.

(56) References Cited

U.S. PATENT DOCUMENTS 8,479,603 B2 * 7/2013 Ikegami .................. B60K 6/48
                                                    74/330
9,187,078 B2 * 11/2015 Jansen .................. B60W 10/06
(Continued)

FOREIGN PATENT DOCUMENTS

JP       2003-269597 A      9/2003
JP       2003-278577 A     10/2003
(Continued)

OTHER PUBLICATIONS

International Search Report for PCT/JP2013/061880 dated Jul. 23, 2013.

*Primary Examiner* — Stacey Fluhart
(74) *Attorney, Agent, or Firm* — Sughrue Mion, PLLC; Richard C. Turner

(57) ABSTRACT

The control device for a hybrid vehicle includes: a mechanical power source; an electric motor to be used when the mechanical power source is started; a first clutch arranged between the mechanical power source and a first transmission mechanism including a plurality of gear shift stages; a second clutch arranged between the mechanical power source and a second transmission mechanism including a plurality of gear shift stages; an electrical power source coupled to an input shaft of the first transmission mechanism; and a control unit for controlling a torque of at least one of the second clutch or the electric motor so as to compensate a braking force decreased upon a gear shift in the electrical power source when a gear shift request for (Continued)

shifting the gear shift stage of the first transmission mechanism is made during a regeneration travel of the electrical power source.

15 Claims, 9 Drawing Sheets

(51) Int. Cl.
    *B60K 6/547*         (2007.10)
    *B60L 11/14*         (2006.01)
    *B60W 10/02*        (2006.01)
    *B60W 10/08*        (2006.01)
    *B60W 10/10*        (2012.01)
    *B60W 10/113*       (2012.01)
    *F16D 48/02*        (2006.01)
    *B60K 6/48*         (2007.10)
    *B60W 20/30*        (2016.01)
    *F16D 48/06*        (2006.01)

(52) U.S. Cl.
    CPC ............ *B60W 10/02* (2013.01); *B60W 10/08* (2013.01); *B60W 10/10* (2013.01); *B60W 10/113* (2013.01); *B60W 20/00* (2013.01); *B60W 20/14* (2016.01); *B60W 20/30* (2013.01); *F16D 48/02* (2013.01); *F16D 48/066* (2013.01); *B60W 2510/0638* (2013.01); *B60W 2510/10* (2013.01); *B60W 2710/021* (2013.01); *B60W 2710/027* (2013.01); *B60W 2710/081* (2013.01); *B60W 2710/083* (2013.01); *B60W 2710/248* (2013.01); *F16D 2500/1066* (2013.01); *F16D 2500/5029* (2013.01); *F16D 2500/50669* (2013.01); *F16D 2500/7044* (2013.01); *Y02T 10/6221* (2013.01); *Y02T 10/7258* (2013.01); *Y10S 903/902* (2013.01); *Y10T 477/26* (2015.01)

(56) References Cited

U.S. PATENT DOCUMENTS

| | | | |
|---|---|---|---|
| 9,254,738 B2* | 2/2016 | Schulte | B60K 6/387 |
| 2006/0142115 A1* | 6/2006 | Senda | B60W 10/02 |
| | | | 477/6 |
| 2011/0233020 A1 | 9/2011 | Tajima | |
| 2012/0234133 A1 | 9/2012 | Ikegami et al. | |
| 2014/0195082 A1* | 7/2014 | Takamura | B60L 11/14 |
| | | | 701/22 |

FOREIGN PATENT DOCUMENTS

| | | |
|---|---|---|
| JP | 2010-083454 A | 4/2010 |
| JP | 2010-126121 A | 6/2010 |
| JP | 2011-079379 A | 4/2011 |
| JP | 2011-079380 A | 4/2011 |
| JP | 2012-224132 A | 11/2012 |

* cited by examiner

CONTROL DEVICE AND CONTROL METHOD FOR A HYBRID VEHICLE

CROSS REFERENCE TO RELATED APPLICATIONS

This application is a National Stage of International Application No. PCT/JP2013/061880 filed Apr. 23, 2013, the contents of all of which are incorporated herein by reference in their entirety.

TECHNICAL FIELD

The present invention relates to a control device and a control method for a hybrid vehicle including a dual clutch transmission and a drive motor (electric motor) provided for one of odd-numbered gears and even-numbered gears of the transmission.

BACKGROUND ART

In recent years, in the field of a transmission for a vehicle, a so-called dual clutch transmission (DCT) for continuously transmitting power from a power source to wheels as a driving force is known.

The dual clutch transmission has the following configuration. That is, the dual clutch transmission includes a first transmission mechanism including odd-numbered gear shift stages, a second transmission mechanism including even-numbered gear shift stages, a first clutch interposed between a power source and the first transmission mechanism, for transmitting power from the power source to the first transmission mechanism or shutting off the transmission of the power, and a second clutch interposed between the power source and the second transmission mechanism, for transmitting power from the power source to the second transmission mechanism or shutting off the transmission of the power.

Moreover, in recent years, there exists even a hybrid vehicle having the above-mentioned dual clutch transmission installed thereon. As one hybrid vehicle described above, a hybrid vehicle having the following configuration is known. That is, a mechanical power source such as an engine is used as the power source arranged via the first clutch and the second clutch, and an electrical power source such as a drive motor is arranged as another power source on an input shaft of any one of the first transmission mechanism and the second transmission mechanism.

However, the above-mentioned hybrid vehicle has the following problem. That is, during the deceleration in the hybrid vehicle, in some cases, any one of the first clutch and the second clutch is disengaged, and the mechanical power source is stopped, to thereby perform regenerative control of the electrical power source.

On this occasion, in the hybrid vehicle, for example, a gear shift request of shifting between the respective gear shift stages of the transmission mechanism to which the electrical power source is coupled may be made during the regenerative control through the deceleration. On this occasion, when the gear shift request is made during the regenerative control through the deceleration, all synchronizer mechanisms in the transmission mechanism on the drive motor side are brought into a free rotation state. As a result, a state in which a motor torque becomes zero, namely a so-called torque drop, is caused, and a driver feels a sense of discomfort.

As a method of solving this problem, there is proposed a method of suppressing the torque drop by adjusting the torque of the second clutch in a range less than a cranking torque so as to maintain a braking force upon the gear shift during the regenerative travel (for example, refer to Patent Literature 1).

Moreover, there is proposed a method of suppressing the torque drop by engaging the first clutch once during the regeneration travel to generate an engine brake, and adjusting the torque of the second clutch upon the gear shift (for example, refer to Patent Literature 2).

Further, there is proposed a method of suppressing the torque drop by using a brake cooperation system capable of adjusting brakes on wheels independently of a depression amount of a brake pedal, and adjusting friction brake amounts on the wheels in an area where a torque of the drive motor needs to be 0 for the gear shift (for example, refer to Patent Literature 3).

CITATION LIST

Patent Literature

[PTL 1] JP 2012-224132 A
[PTL 2] JP 2011-79379 A
[PTL 3] JP 2011-79380 A

SUMMARY OF INVENTION

Technical Problem

However, the related art has the following problems.

The invention according to Patent Literature 1 has the following problems. When the second clutch is completely directly engaged, the braking force cannot be generated, resulting in failure of the suppression of the torque drop. Moreover, when the braking force by the drive motor is large, the torque of the second clutch needs to be increased, and hence a torque larger than the cranking torque may be necessary. However, on this occasion, the torque drop cannot be suppressed.

Moreover, the invention according to Patent Literature 2 has the following problems. When the braking force by the drive motor is large, a torque larger than the engine brake may be necessary. However, on this occasion, the torque drop cannot be suppressed. Moreover, the engine is once cranked, and hence the control becomes complex, and completion of the suppression of the torque drop takes time.

Moreover, the invention according to Patent Literature 3 has the following problem. A mechanism for adjusting the braking forces independently of the depression amount of the brake pedal, a simulator for preventing the driver from feeling the sense of discomfort of the hydraulic brake, and the like are required. Therefore, a device configuration becomes complex, and a cost of the device greatly increases.

The present invention has been made to solve the above-mentioned problems, and therefore has an object to provide a control device and a control method for a hybrid vehicle capable of suppressing the torque drop to be caused upon the gear shift during the drive motor regeneration travel by using a simple and inexpensive configuration.

Solution to Problem

According to one embodiment of the present invention, there is provided a control device for a hybrid vehicle, including: a mechanical power source; an electric motor to be used when the mechanical power source is started; a first clutch arranged between the mechanical power source and a first transmission mechanism including a plurality of gear shift stages, for transmitting power of the mechanical power source to the first transmission mechanism or shutting off the transmission; a second clutch arranged between the mechanical power source and a second transmission mechanism including a plurality of gear shift stages, for transmitting the power of the mechanical power source to the second transmission mechanism or shutting off the transmission; an electrical power source coupled to an input shaft of the first transmission mechanism, and capable of carrying out regenerative driving; and a control unit for controlling a torque of at least one of the second clutch or the electric motor so as to compensate a braking force decreased upon a gear shift in the electrical power source when a gear shift request for shifting the gear shift stage of the first transmission mechanism is made during a regeneration travel of the electrical power source.

Further, according to one embodiment of the present invention, there is provided a control method for a hybrid vehicle, which is to be carried out by a control device for a hybrid vehicle including: a mechanical power source; an electric motor to be used when the mechanical power source is started; a first clutch arranged between the mechanical power source and a first transmission mechanism including a plurality of gear shift stages, for transmitting power of the mechanical power source to the first transmission mechanism or shutting off the transmission; a second clutch arranged between the mechanical power source and a second transmission mechanism including a plurality of gear shift stages, for transmitting the power of the mechanical power source to the second transmission mechanism or shutting off the transmission; and an electrical power source coupled to an input shaft of the first transmission mechanism, and capable of carrying out regenerative driving, the control method including the steps of: determining whether or not a gear shift request for shifting the gear shift stage of the first transmission mechanism is made during a regeneration travel of the electrical power source; and controlling a torque of at least one of the second clutch or the electric motor so as to compensate a braking force decreased upon a gear shift in the electrical power source when the gear shift request is made.

Advantageous Effects of Invention

According to the control device and the control method for a hybrid vehicle of the one embodiment of the present invention, when the gear shift request of shifting the gear shift stage of the first transmission mechanism is made during the regeneration travel of the electrical power source, the control unit (step) controls the torque of at least one of the second clutch or the electric motor so as to compensate the braking force decreased upon the gear shift in the electrical power source.

Therefore, it is possible to suppress the torque drop to be caused upon the gear shift during the drive motor regeneration travel by using a simple and inexpensive configuration.

DESCRIPTION OF EMBODIMENTS

Figure 1:
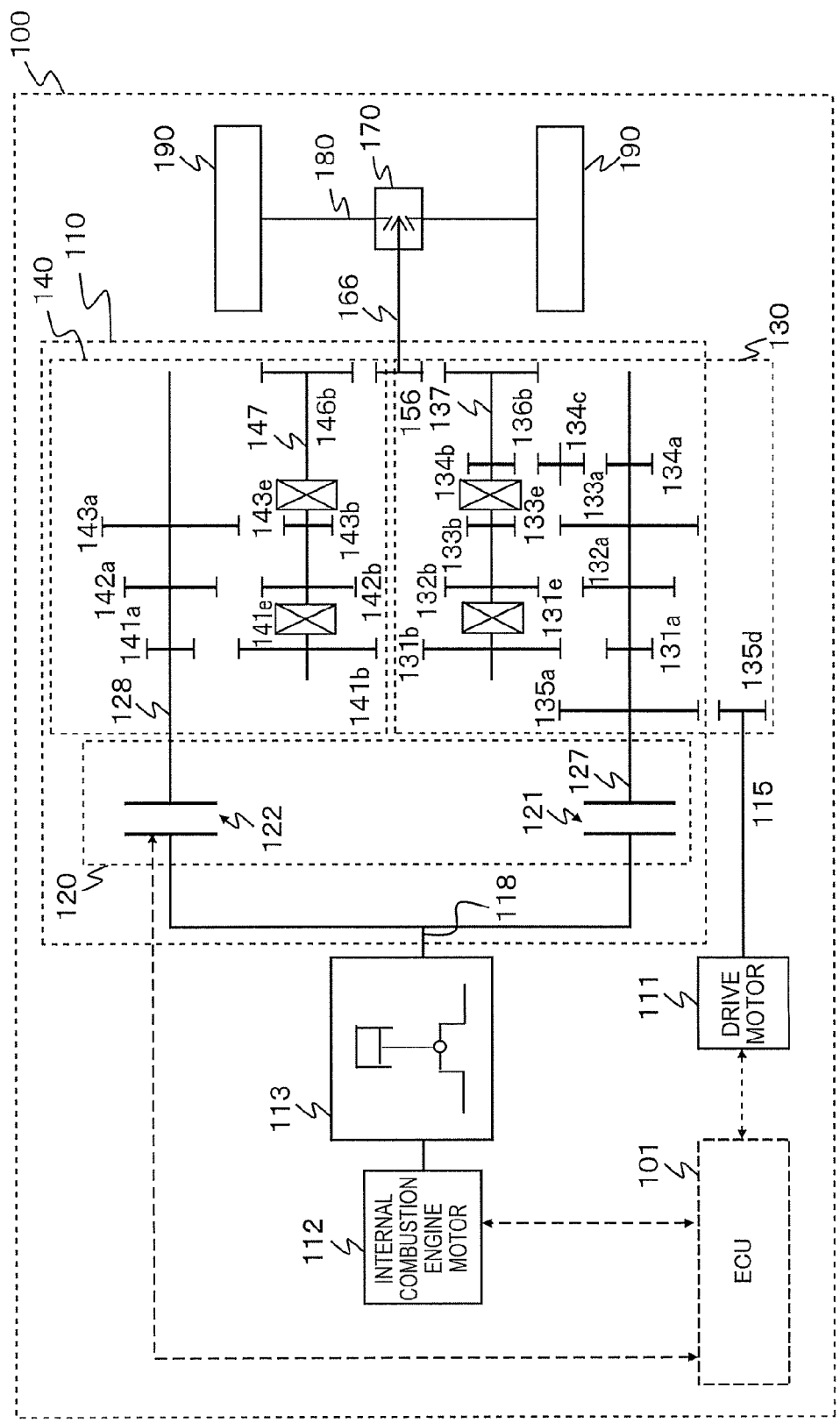
FIG. 1 is a configuration diagram for illustrating a control device for a hybrid vehicle according to a first embodiment of the present invention.

A description is now given of a control device and a control method for a hybrid vehicle according to exemplary embodiments of the present invention referring to the drawings, and like or corresponding components are denoted by like reference symbols throughout the drawings.

It should be noted that, in the embodiments described below, a description is given of a case in which a first transmission mechanism 130 is used for odd-numbered gear shift stages and a second transmission mechanism 140 is used for even-numbered gear shift stages as an example, but the odd-numbered gear shift stages and the even-numbered gear shift stages may be interchanged each other.

First Embodiment

FIG. 1 is a configuration diagram for illustrating a control device for a hybrid vehicle according to a first embodiment of the present invention. In FIG. 1, a hybrid vehicle 100 relating to this control device for a hybrid vehicle includes a dual clutch transmission 110 as a transmission, and includes, as prime movers (power sources), a drive motor (electrical power source) 111 and an internal combustion engine (mechanical power source, engine) 113 having an internal combustion engine motor (electric motor) 112 installed thereon.

On this occasion, the drive motor 111 is installed for any one of the odd-numbered gear shift stages and the even-numbered gear shift stages (in FIG. 1, for the odd-numbered gear shift stages) of the dual clutch transmission 110. Moreover, the internal combustion engine motor 112 can start the internal combustion engine 113 via a pulley (not shown).

The dual clutch transmission 110 changes a mechanical power from at least one of the drive motor 111 or the internal combustion engine 113, and transmits the power to drive wheels 190. Moreover, the dual clutch transmission 110 includes a dual clutch mechanism 120, the first transmission mechanism 130, and the second transmission mechanism 140.

The dual clutch mechanism 120 switches between the engaged state and the disengaged state of a first clutch 121 and a second clutch 122, to thereby switch a transmission path of the mechanical power from an engine output shaft 118 of the internal combustion engine 113 between a first input shaft 127 of the first transmission mechanism 130 and a second input shaft 128 of the second transmission mechanism 140.

The first clutch 121 is a hydraulic multi-plate clutch capable of transmitting the mechanical power from the engine output shaft 118 to the first input shaft 127 of the first transmission mechanism 130. The second clutch 122 is a hydraulic multi-plate clutch capable of transmitting the mechanical power from the engine output shaft 118 to the second input shaft 128 of the second transmission mechanism 140.

The first transmission mechanism 130 includes the first input shaft 127 and a first output shaft 137, and includes, as gear pairs for gear stages (gear shift stages), a first-speed gear pair 131a and 131b, a third-speed gear pair 132a and 132b, a fifth-speed gear pair 133a and 133b, an R-speed gear pair 134a, 134b, and 134c, and a gear pair 135a and 135d capable of transmitting and receiving a torque between a motor drive shaft 115 of the drive motor 111 and the first input shaft 127.

Moreover, the first transmission mechanism 130 includes synchronizer mechanisms 131e and 133e having a function of switching a meshing state and a free rotation state of the above-mentioned gear pairs, and a first drive gear 136b coupled to the first output shaft 137 and always meshing with a power integration gear 156. It should be noted that a description is later given of an operation of the synchronizer mechanisms 131e and 133e.

The second transmission mechanism 140 includes the second input shaft 128 and a second output shaft 147, and includes, as gear pairs for gear stages (gear shift stages), a second-speed gear pair 141a and 141b, a fourth-speed gear pair 142a and 142b, and a sixth-speed gear pair 143a and 143b.

Moreover, the second transmission mechanism 140 includes synchronizer mechanisms 141e and 143e having a function of switching a meshing state and a free rotation state of the above-mentioned gear pairs, and a second drive gear 146b coupled to the second output shaft 147 and always meshing with the power integration gear 156.

When the torques are received and transmitted between a propeller shaft 166 and each of the first output shaft 137 and the second output shaft 147, the power integration gear 156 integrates these torques. Moreover, the propeller shaft 166 couples to a final reduction/differential mechanism 170, and enables transmission/reception of a torque via the power integration gear 156 between the drive wheels 190 and the dual clutch transmission 110.

The final reduction/differential mechanism 170 is a final reduction mechanism for reducing the mechanical power transmitted from at least one of the drive motor 111 or the internal combustion engine 113 to the propeller shaft 166, and a differential mechanism for distributing the mechanical power to right and left drive shafts 180 to rotationally drive the drive wheels 190 respectively coupled to the drive shafts 180.

On this occasion, an electronic control unit (control unit, ECU) 101 is provided for the hybrid vehicle 100. The electronic control unit 101 includes a ROM (not shown) as storage means for storing various control constants.

Moreover, the electronic control unit 101 is connected to the drive motor 111, the internal combustion engine motor 112, the second clutch 122, and various controllers and sensors (not shown), and controls the torque of the internal combustion engine motor 112 and the torque of the second clutch 122 based on the stored various control constants and acquired information.

Figure 2:
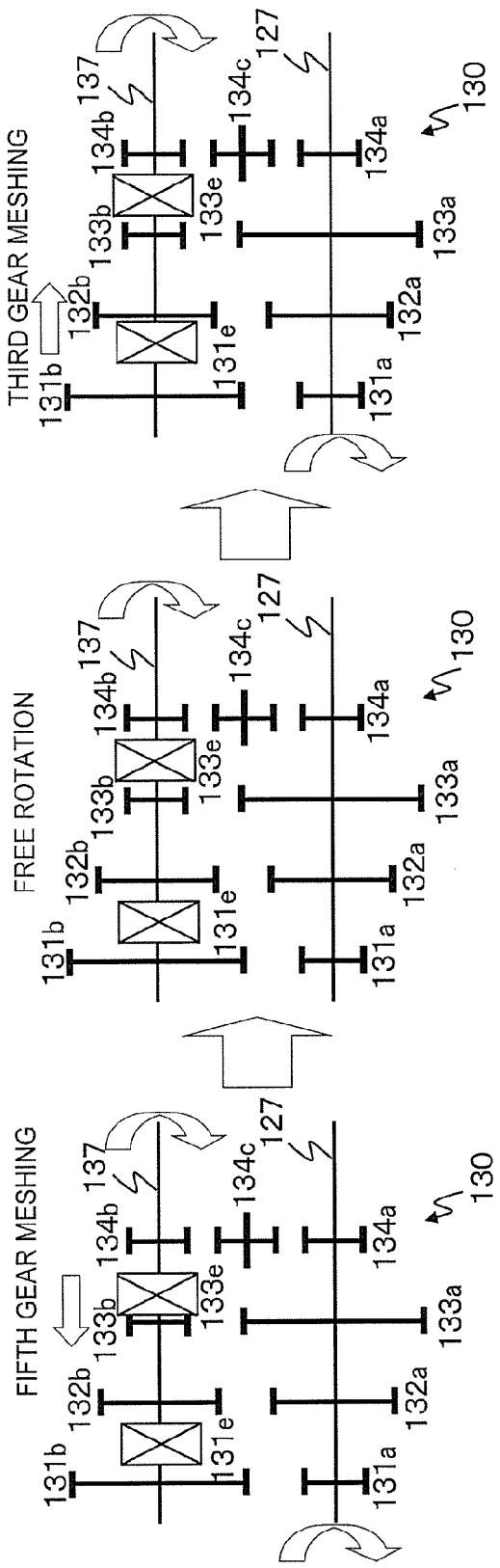
FIG. 2 is an explanatory diagram for illustrating a switching operation between a gear meshing state and a free rotation state of synchronizer mechanisms of a first transmission mechanism in the control device for a hybrid vehicle according to the first embodiment of the present invention.

Referring to FIG. 2, a description is now given of the switching operation between the gear meshing state and the free rotation state of the synchronizer mechanisms 131e and 133e of the first transmission mechanism 130. In FIG. 2, as an example, a time-series image when the fifth gear is shifted to the third gear in the first transmission mechanism 130 is illustrated.

In FIG. 2, for gear shift to each of the gear stages, out of the synchronizer mechanisms 131e and 133e of the first transmission mechanism 130, the synchronizer mechanism 131e switches between the gear meshing and the free rotation for the first gear and the third gear, and the synchronizer mechanism 133e switches between the gear meshing and the free rotation for the fifth gear and the R gear.

First, when the first transmission mechanism 130 is at the fifth gear, the synchronizer mechanism 133e meshes with the gear 133b coaxially existing on the first output shaft 137, thereby transmitting the torque via the gear 133a coaxially existing on the first input shaft 127.

Figure 3:
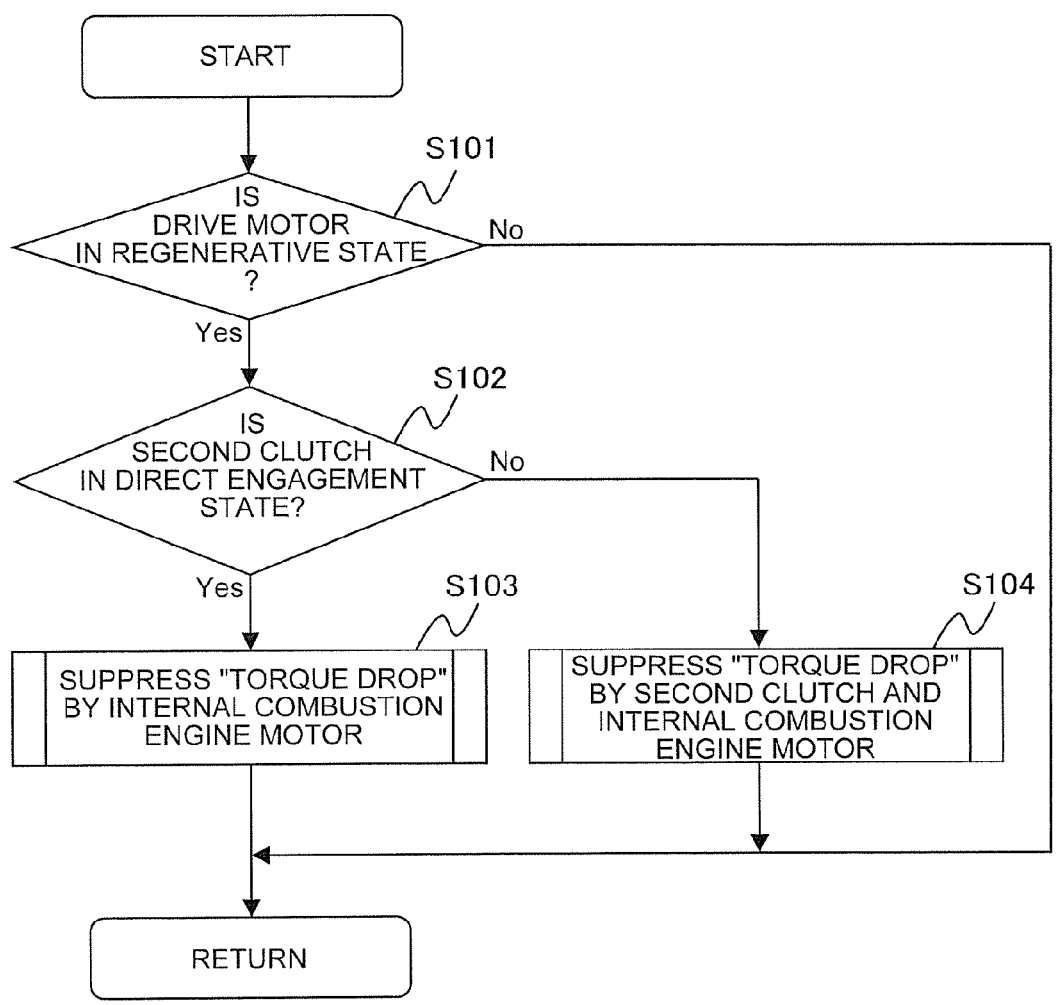
FIG. 3 is a flowchart for illustrating control processing to be performed by the control device for a hybrid vehicle according to the first embodiment of the present invention.

Referring to a flowchart of FIG. 3, a description is now given of control processing to be performed by the control device for a hybrid vehicle according to the first embodiment of the present invention. In FIG. 3, a method of suppressing a torque drop to be caused upon the gear shift during the regeneration travel by the drive motor 111 is changed depending on whether or not the second clutch 122 is directly engaged. It should be noted that the flowchart of FIG. 3 is carried out, for example, at an interval of 10 milliseconds by the electronic control unit 101.

First, whether or not the drive motor 111 is in the regenerative state is determined based on information on the drive motor 111 such as a motor rpm (Step S101).

When, in Step S101, it is determined that the drive motor 111 is not in the regenerative state (that is, No), the processing of FIG. 3 is directly ended.

On the other hand, when, in Step S101, it is determined that the drive motor 111 is in the regenerative state (that is, Yes), whether or not the second clutch 122 is in a direct engagement state is determined (Step S102).

On this occasion, regarding the direct engagement state of the second clutch 122, when a differential rotation of the second clutch 122 (difference in rpm between the drive wheel side and the internal combustion engine side) is equal to or less than a predetermined value acquired by an experiment or the like such as 5 rpm, it is determined that the second clutch 122 is in the direct engagement state.

When, in Step S102, it is determined that the second clutch 122 is in the direct engagement state (that is, Yes), a method of suppressing the torque drop by using the internal combustion engine motor 112 is carried out (Step S103), and the processing of FIG. 3 is ended. It should be noted that the method of suppressing the torque drop by using the internal combustion engine motor 112 is described later.

On the other hand, when, in Step S102, it is determined that the second clutch 122 is not in the direct engagement state (that is, No), a method of suppressing the torque drop by using the second clutch 122 and the internal combustion engine motor 112 is carried out (Step S104), and the processing of FIG. 3 is ended. It should be noted that the method of suppressing the torque drop by using the second clutch 122 and the internal combustion engine motor 112 is described later.

Figure 4:
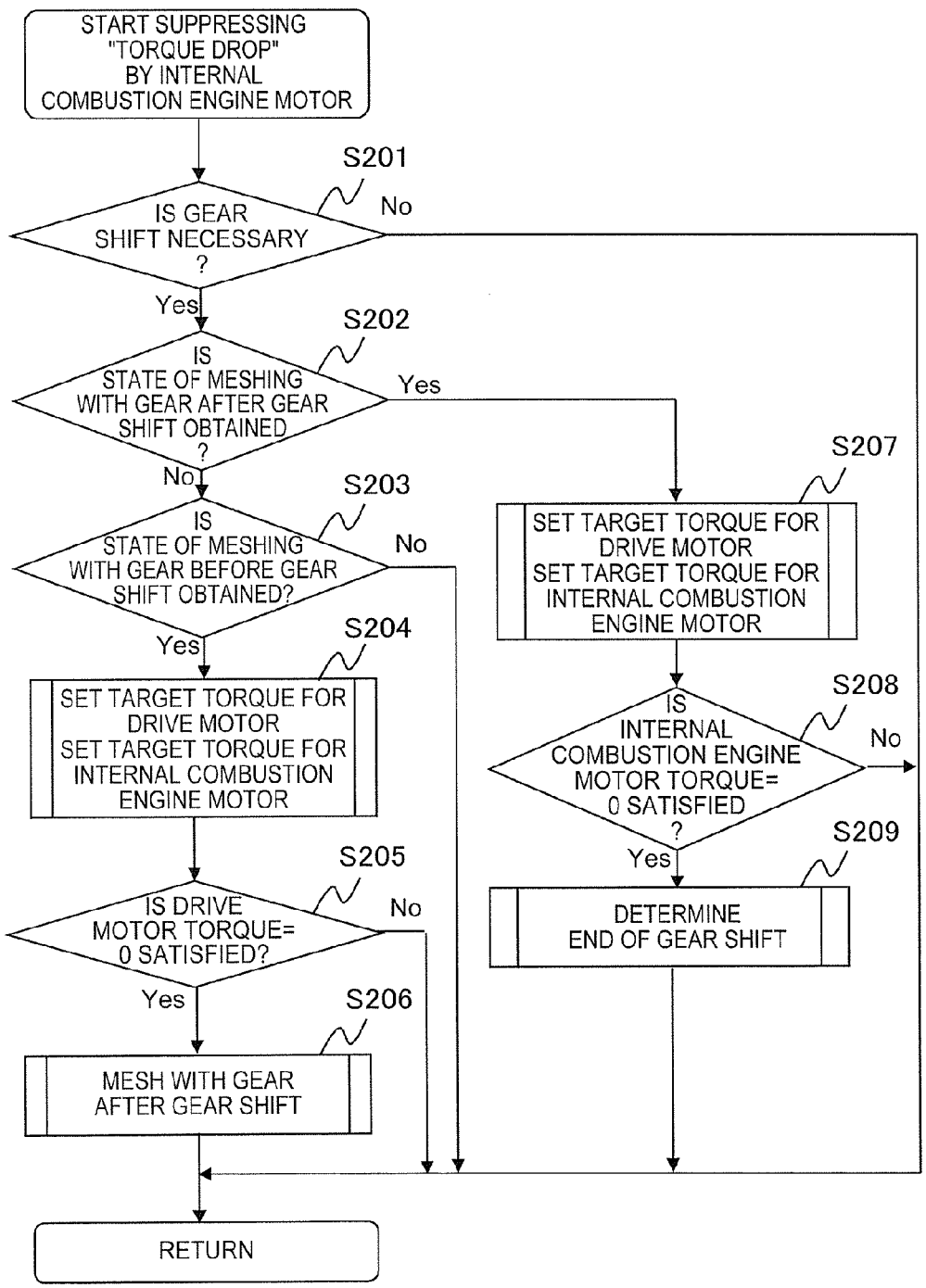
FIG. 4 is a flowchart for illustrating processing of adjusting a torque of an internal combustion engine motor to suppress a torque drop in the control device for a hybrid vehicle according to the first embodiment of the present invention.

Referring to a flowchart of FIG. 4, a description is now given of the processing (the processing in Step S103 of FIG. 3) of adjusting the torque of the internal combustion engine motor 112 to suppress the torque drop to be caused upon the gear shift during the regeneration travel by the drive motor 111. It should be noted that the flowchart of FIG. 4 is carried out, for example, at an interval of 10 milliseconds by the electronic control unit 101.

First, whether or not the gear shift is necessary is determined depending on vehicle states such as a vehicle speed (Step S201). On this occasion, this determination may be made by directly sensing the vehicle states or based on signals received by means of communication, which represent measurement results by other controllers (such as a TM controller).

When, in Step S201, it is determined that the gear shift is not necessary (that is, No), the processing of FIG. 4 is directly ended.

On the other hand, when, in Step S201, it is determined that the gear shift is necessary (that is, Yes), it is determined whether or not a state of meshing with a gear stage after the gear shift is obtained in the first transmission mechanism 130 (Step S202). On this occasion, this determination may be made based on a relationship between the motor rpm and the vehicle speed, or by acquiring information from other controllers.

When, in Step S202, it is determined that the state of meshing with the gear stage after the gear shift is not obtained (that is, No), it is determined whether or not a state of meshing with a gear stage before the gear shift is obtained in the first transmission mechanism 130 (Step S203). On this occasion, this determination may be made based on a relationship between the motor rpm and the vehicle speed, or by acquiring information from other controllers as in Step S202.

When, in Step S203, it is determined that the state of meshing with the gear stage before the gear shift is obtained (that is, Yes), the target torque of the drive motor 111 and the target torque of the internal combustion engine motor 112 are set (Step S204).

Specifically, the torque of the drive motor 111 is reduced by a predetermined amount. Moreover, the torque of the internal combustion engine motor 112 is increased so as to compensate a braking force reduced by the reduction in the torque of the drive motor 111. It should be noted that a change period of the torque is such a period that the driver does not feel a sense of discomfort, which is acquired by experiments and the like. A change amount of the torque is represented by the following expressions.

$$\Delta Tm \times Gm = \Delta Tbsg \times Gbsg$$

$$\Delta Tbsg = (\Delta Tm \times Gm) \div Gbsg$$

$$Tbsg(n) = \Delta Tbsg + Tbsg(n-1)$$

In the above-mentioned expressions, $\Delta Tm$ denotes a change amount of the torque of the drive motor 111 per unit step processing, Gm denotes a gear ratio from the drive motor 111 to the drive wheels 190, $\Delta Tbsg$ denotes a change amount of the torque of the internal combustion engine motor 112 per unit step processing, Gbsg denotes a gear ratio from the internal combustion engine motor 112 to the drive wheels 190, and Tbsg(n) denotes a torque after the change of the internal combustion engine motor 112.

Then, whether or not the torque of the drive motor 111 has become 0 is determined (Step S205).

When, in Step S205, it is determined that the torque of the drive motor 111 has become 0 (that is, Yes), the meshing with the gear stage before the gear shift is released, and the meshing with the gear stage after the gear shift is carried out by the synchronizer mechanisms 131e and 133e (Step S206). Then, the processing of FIG. 4 is ended.

On the other hand, when, in Step S203, it is determined that the state of meshing with the gear stage before the gear shift is not obtained (that is, No), and, when, in Step S205, it is determined that the torque of the drive motor 111 has not become 0 (that is, No), the processing of FIG. 4 is directly ended.

Moreover, on the other hand, when, in Step S202, it is determined that the state of meshing with the gear stage after the gear shift is obtained (that is, Yes), the target torque of the drive motor 111 and the target torque of the internal combustion engine motor 112 are set (Step S207).

Specifically, the torque of the internal combustion engine motor 112 is reduced by a predetermined amount. Moreover, the torque of the drive motor 111 is increased so as to compensate a braking force reduced by the reduction in the torque of the internal combustion engine motor 112. It should be noted that a change period of the torque is such a period that the driver does not feel a sense of discomfort, which is acquired by experiments and the like. A change amount of the torque is represented by the following expressions.

$$\Delta Tm \times Gm = \Delta Tbsg \times Gbsg$$

$$\Delta Tm = (\Delta Tbsg \times Gbsg) \div Gm$$

$$Tm(n) = \Delta Tm + Tm(n-1)$$

In the above-mentioned expressions, $\Delta Tm$ denotes the change amount of the torque of the drive motor 111 per unit step processing, Gm denotes the gear ratio from the drive motor 111 to the drive wheels 190, $\Delta Tbsg$ denotes the change amount of the torque of the internal combustion engine motor 112 per unit step processing, Gbsg denotes the gear ratio from the internal combustion engine motor 112 to the drive wheels 190, and Tm(n) denotes a torque after the change of the drive motor 111.

Then, whether or not the torque of the internal combustion engine motor 112 has become 0 is determined (Step S208).

When, in Step S208, it is determined that the torque of the internal combustion engine motor 112 has not become 0 (that is, No), the processing of FIG. 4 is directly ended.

On the other hand, when, in Step S208, it is determined that the torque of the internal combustion engine motor 112 has become 0 (that is, Yes), it is determined that the gear shift has ended, and a signal representing the gear shift end is output (Step S209). Then, the processing of FIG. 4 is ended.

Figure 5:
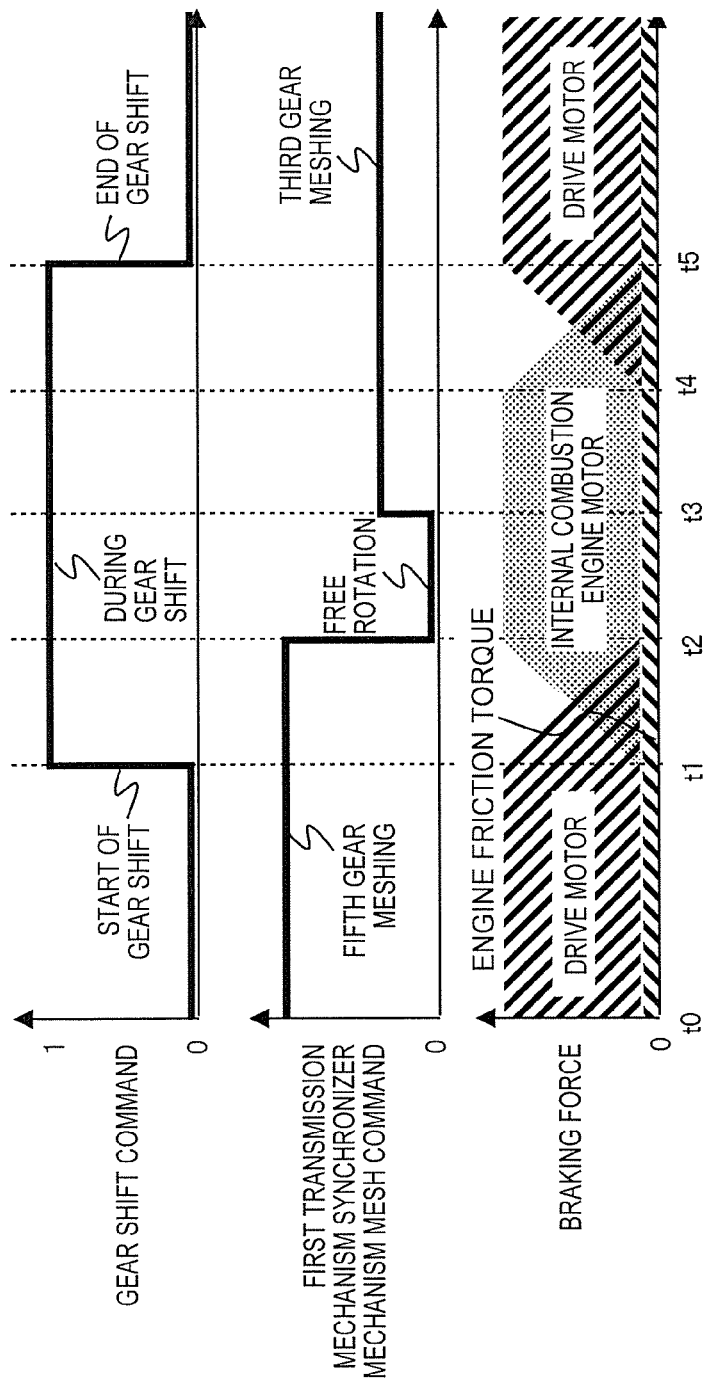
FIG. 5 is a timing chart for illustrating a result of the processing of adjusting the torque of the internal combustion engine motor to suppress the torque drop in the control device for a hybrid vehicle according to the first embodiment of the present invention.

Referring to a timing chart of FIG. 5, a description is now given of a result of the processing (the processing of FIG. 4) of adjusting the torque of the internal combustion engine motor 112 (electric power generation torque) to suppress the torque drop to be caused upon the gear shift during the regeneration travel by the drive motor 111. In FIG. 5, a time sequence when the fifth gear is shifted to the third gear in the first transmission mechanism 130 is illustrated.

In FIG. 5, a first row is a graph for showing whether or not the gear is being shifted. On this occasion, a rise from 0 to 1 represents a gear shift start point and a fall from 1 to 0 represents a gear shift end point. Moreover, a second row is a graph for showing an operation of the synchronizer mechanisms 131e and 133e for meshing the fifth gear and the third gear of the first transmission mechanism 130.

A third row is a graph for showing the braking forces applied to the vehicle. There are shown three braking forces including the braking force generated by the drive motor 111, the braking force generated by the internal combustion engine motor 112, and an engine friction. It should be noted that the braking force applied to the vehicle is a sum of the three braking forces.

Moreover, the internal combustion engine motor 112 according to the first embodiment of the present invention may be an alternator capable of adjusting the torque by adjusting an electric power generation amount. Moreover, according to the first embodiment of the present invention, the torque and the rpm of the drive motor 111 change before and after the gear shift, but the changes are not shown.

In FIG. 5, a period from t0 to t1 represents a period in which the drive motor 111 is driven for the regeneration to generate the braking force. Moreover, the timing t1 is a timing at which it is determined that the gear shift is necessary based on the vehicle information such as the vehicle speed.

A period from t1 to t2 is a period in which the torque of the drive motor 111 is gradually changed to 0 in order for the gear shift. On this occasion, the decreased amount of the braking force by the torque of the drive motor 111 is compensated by the torque of the internal combustion engine motor 112. On this occasion, the change amounts of the torques are the values described in Step S204 of FIG. 4.

Then, the timing t2 is a timing at which the torque of the drive motor 111 becomes 0. At the timing t2, the state in which the torque of the drive motor 111 is 0 is confirmed, and the release of the meshing with the fifth gear is started. Moreover, a period from t2 to t3 is a period in which the gear is switched by the synchronizer mechanisms 131e and 133e, and the meshing with the fifth gear is being released.

The timing t3 is a timing at which the release of the meshing with the fifth gear is confirmed, and the meshing with the third gear is started. Moreover, a period from t3 to t4 is a period in which the gear is switched by the synchronizer mechanisms 131e and 133e, and the meshing with the third gear is being carried out.

The timing t4 is a timing at which the meshing with the third gear is confirmed. Moreover, a period from t4 to t5 is a period in which the torque generated by the internal combustion engine motor 112 is gradually changed to 0. On this occasion, the decreased amount of the braking force by the torque of the internal combustion engine motor 112 is compensated by the torque of the drive motor 111. On this occasion, the change amounts of the torques are the values described in Step S207 of FIG. 4.

Then, the timing t5 is a timing at which the torque of the internal combustion engine motor 112 becomes 0, and it is determined that the gear shift has completed.

As the period from t1 to t5 represents, the torque drop upon the gear shift is prevented by compensating the braking force corresponding to the decrease in the torque of the drive motor 111 by the internal combustion engine motor 112, and the driver does not feel the sense of discomfort. Moreover, the internal combustion engine motor 112 originally used to start the engine is used, and an increase in the cost is thus not necessary.

Figure 6:
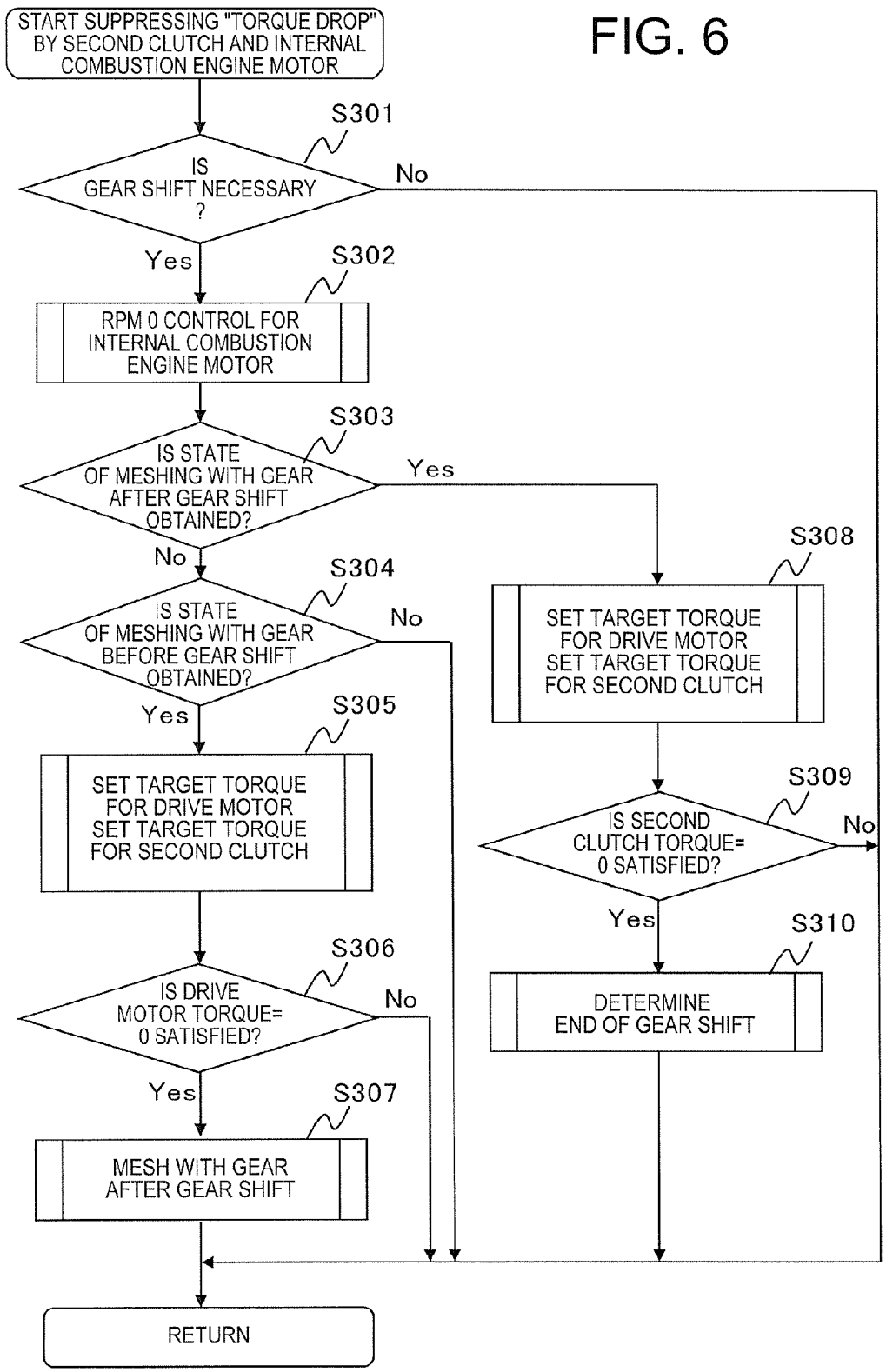
FIG. 6 is a flowchart for illustrating processing of adjusting a torque of each of a second clutch and the internal combustion engine motor to suppress the torque drop in the control device for a hybrid vehicle according to the first embodiment of the present invention.

Referring to a flowchart of FIG. 6, a description is now given of the processing (the processing in Step S104 of FIG. 3) of adjusting the torque of each of the second clutch 122 and the internal combustion engine motor 112 to suppress the torque drop to be caused upon the gear shift during the regeneration travel by the drive motor 111. It should be noted that the flowchart of FIG. 6 is carried out, for example, at an interval of 10 milliseconds by the electronic control unit 101.

First, whether or not the gear shift is necessary is determined depending on vehicle states such as a vehicle speed (Step S301). On this occasion, this determination may be made by directly sensing the vehicle states or based on signals received by means of communication, which represent measurement results by other controllers (such as a TM controller).

When, in Step S301, it is determined that the gear shift is not necessary (that is, No), the processing of FIG. 6 is directly ended.

On the other hand, when, in Step S301, it is determined that the gear shift is necessary (that is, Yes), torque control for the internal combustion engine motor 112 (rpm 0 control for the internal combustion engine motor 112) is carried out so that the rpm of the internal combustion engine 113 is 0 (Step S302). On this occasion, the torque may be compensated by short-circuiting three phase lines (U phase, V phase, and W phase) of the internal combustion engine motor 112.

Then, it is determined whether or not a state of meshing with a gear stage after the gear shift is obtained in the first transmission mechanism 130 (Step S303). On this occasion, this determination may be made based on a relationship between the motor rpm and the vehicle speed, or by acquiring information from other controllers.

When, in Step S303, it is determined that the state of meshing with the gear stage after the gear shift is not obtained (that is, No), it is determined whether or not a state of meshing with a gear stage before the gear shift is obtained in the first transmission mechanism 130 (Step S304). On this occasion, this determination may be made based on a relationship between the motor rpm and the vehicle speed, or by acquiring information from other controllers as in Step S303.

When, in Step S304, it is determined that the state of meshing with the gear stage before the gear shift is obtained (that is, Yes), the target torque of the drive motor 111 and the target torque of the second clutch 122 are set (Step S305).

Specifically, the torque of the drive motor 111 is reduced by a predetermined amount. Moreover, the transmission torque of the second clutch 122 is increased so as to compensate a braking force reduced by the reduction in the torque of the drive motor 111. It should be noted that a change period of the torque is such a period that the driver does not feel a sense of discomfort, which is acquired by experiments and the like. A change amount of the torque is represented by the following expressions.

$$\Delta Tm \times Gm = \Delta T2 \times G2$$

$$\Delta T2 = (\Delta Tm \times Gm) \div G2$$

$$T2(n) = \Delta T2 + T2(n-1)$$

In the above-mentioned expressions, $\Delta Tm$ denotes a change amount of the torque of the drive motor 111 per unit step processing, Gm denotes a gear ratio from the drive motor 111 to the drive wheels 190, ΔT2 denotes a change amount of the transmission torque of the second clutch 122 per unit step processing, G2 denotes a gear ratio from the second input shaft 128 to the drive wheels 190, and T2(n) denotes a transmission torque after the change of the second clutch 122.

Then, whether or not the torque of the drive motor 111 has become 0 is determined (Step S306).

When, in Step S306, it is determined that the torque of the drive motor 111 has become 0 (that is, Yes), the meshing with the gear stage before the gear shift is released, and the meshing with the gear stage after the gear shift is carried out by the synchronizer mechanisms 131e and 133e (Step S307). Then, the processing of FIG. 6 is ended.

On the other hand, when, in Step S304, it is determined that the state of meshing with the gear stage before the gear shift is not obtained (that is, No), and, when, in Step S306, it is determined that the torque of the drive motor 111 has not become 0 (that is, No), the processing of FIG. 6 is directly ended.

Moreover, on the other hand, when, in Step S303, it is determined that the state of meshing with the gear stage after the gear shift is obtained (that is, Yes), the target torque of the drive motor 111 and the target torque of the second clutch 122 are set (Step S308).

Specifically, the transmission torque of the second clutch 122 is reduced by a predetermined amount. Moreover, the torque of the drive motor 111 is increased so as to compensate a braking force reduced by the reduction in the transmission torque of the second clutch 122. It should be noted that a change period of the torque is such a period that the driver does not feel a sense of discomfort, which is acquired by experiments and the like. A change amount of the torque is represented by the following expressions.

$$Tm \times Gm = \Delta T2 \times G2$$

$$\Delta Tm = (\Delta T2 \times G2) \div Gm$$

$$Tm(n) = \Delta Tm + Tm(n-1)$$

In the above-mentioned expressions, ΔTm denotes the change amount of the torque of the drive motor 111 per unit step processing, Gm denotes the gear ratio from the drive motor 111 to the drive wheels 190, ΔT2 denotes the change amount of the transmission torque of the second clutch 122 per unit step processing, G2 denotes the gear ratio from the second input shaft 128 to the drive wheels 190, and Tm(n) denotes a torque after the change of the drive motor 111.

Then, whether or not the transmission torque of the second clutch 122 has become 0 is determined (Step S309).

When, in Step S309, it is determined that the transmission torque of the second clutch 122 has not become 0 (that is, No), the processing of FIG. 6 is directly ended.

On the other hand, when, in Step S309, it is determined that the transmission torque of the second clutch 122 has become 0 (that is, Yes), it is determined that the gear shift has ended, and a signal representing the gear shift end is output (Step S310). Then, the processing of FIG. 6 is ended.

Figure 7:
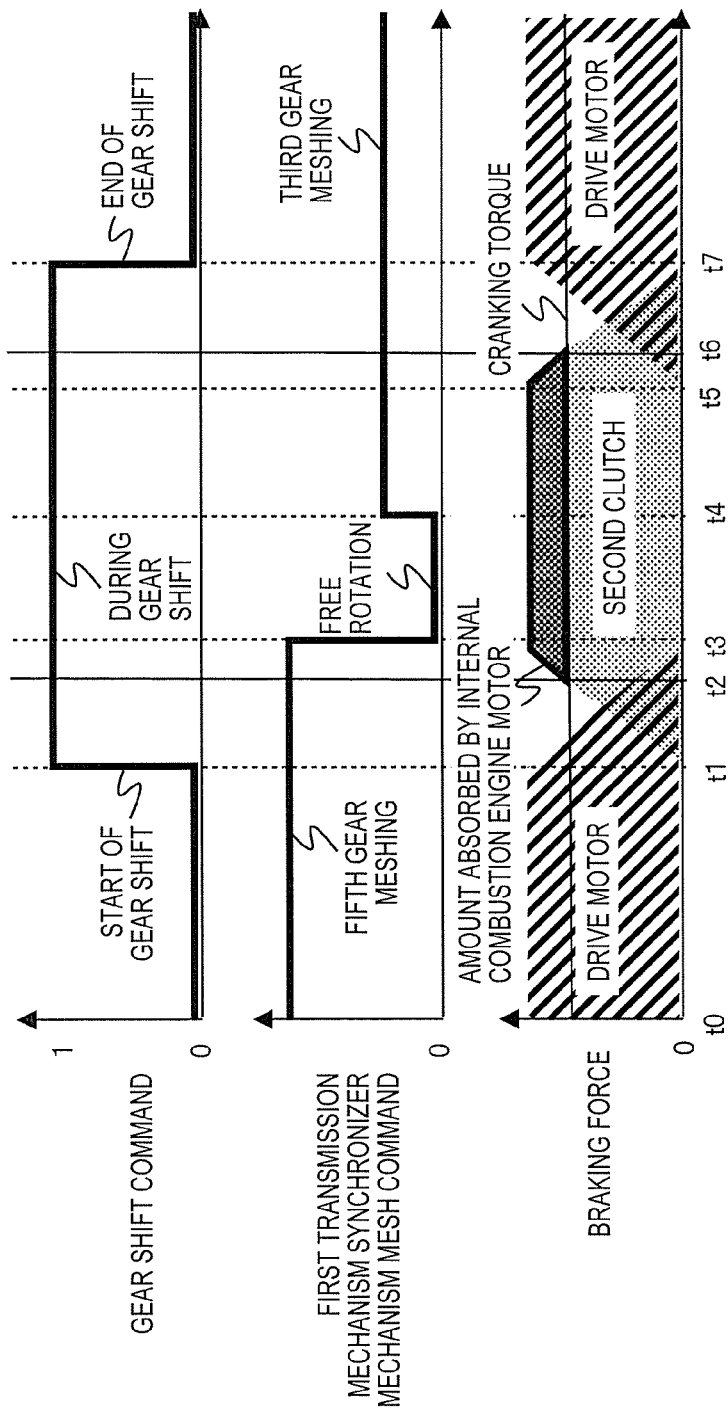
FIG. 7 is a timing chart for illustrating a result of the processing of adjusting the torque of each of the second clutch and the internal combustion engine motor to suppress the torque drop in the control device for a hybrid vehicle according to the first embodiment of the present invention.

Referring to a timing chart of FIG. 7, a description is now given of a result of the processing (the processing of FIG. 6) of adjusting the torque of each of the second clutch 122 and the internal combustion engine motor 112 to suppress the torque drop to be caused when the engine is stopped during the gear shift, and when the gear is shifted during the regeneration travel by the drive motor 111. In FIG. 7, a time sequence when the fifth gear is shifted to the third gear in the first transmission mechanism 130 is illustrated.

In FIG. 7, a first row is a graph for showing whether or not the gear is being shifted. On this occasion, a rise from 0 to 1 represents a gear shift start point and a fall from 1 to 0 represents a gear shift end point. Moreover, a second row is a graph for showing an operation of the synchronizer mechanisms 131e and 133e for meshing the fifth gear and the third gear of the first transmission mechanism 130.

A third row is a graph for showing the braking forces applied to the vehicle. There are shown two braking forces including the braking force generated by the drive motor 111 and the braking force generated by the second clutch 122 and the internal combustion engine motor 112. It should be noted that the braking force applied to the vehicle is a sum of the two braking forces.

Moreover, a braking force compensated by the internal combustion engine motor 112 when the braking force of the second clutch 122 is equal to or more than a cranking torque is represented by thick lines. Moreover, according to the first embodiment of the present invention, the torque and the rpm of the drive motor 111 change before and after the gear shift, but the changes are not shown.

In FIG. 7, a period from t0 to t1 represents a period in which the drive motor 111 is driven for the regeneration to generate the braking force. Moreover, the timing t1 is a timing at which it is determined that the gear shift is necessary based on the vehicle information such as the vehicle speed.

A period from t1 to t3 is a period in which the torque of the drive motor 111 is gradually changed to 0 in order for the gear shift. On this occasion, the decreased amount of the braking force by the torque of the drive motor 111 is compensated by the transmission torque of the second clutch 122. On this occasion, the change amounts of the torques are the values described in Step S305 of FIG. 6.

It should be noted that the timing t2 is a timing at which the transmission torque of the second clutch 122 reaches the cranking torque, and the engine rpm 0 control by the internal combustion engine motor 112 is started. Moreover, a period from t2 to t6 is a period in which the transmission torque of the second clutch 122 is equal to or more than the cranking torque, and the internal combustion engine motor 112 carries out the engine rpm 0 control so that the engine does not rotate. On this occasion, the torque may be compensated by short-circuiting the three phase lines (U phase, V phase, and W phase) of the internal combustion engine motor 112.

Then, the timing t3 is a timing at which the torque of the drive motor 111 becomes 0. At the timing t3, the state in which the torque of the drive motor 111 is 0 is confirmed, and the release of the meshing with the fifth gear is started. Moreover, a period from t3 to t4 is a period in which the gear is switched by the synchronizer mechanisms 131e and 133e, and the meshing with the fifth gear is being released.

The timing t4 is a timing at which the release of the meshing with the fifth gear is confirmed, and the meshing with the third gear is started. Moreover, a period from t4 to t5 is a period in which the gear is switched by the synchronizer mechanisms 131e and 133e, and the meshing with the third gear is being carried out.

The timing t5 is a timing at which the meshing with the third gear is confirmed. Moreover, a period from t5 to t7 is a period in which the transmission torque generated by the second clutch 122 is gradually changed to 0. On this occasion, the decreased amount of the braking force by the transmission torque of the second clutch 122 is compensated by the torque of the drive motor 111. On this occasion, the change amounts of the torques are the values described in Step S308 of FIG. 6.

The timing t6 is a timing at which the transmission torque of the second clutch 122 becomes less than the cranking torque, and the engine rpm 0 control by the internal combustion engine motor 112 is ended. Moreover, the timing t7 is a timing at which the transmission torque of the second clutch 122 becomes 0, and it is determined that the gear shift has completed.

As the period from t1 to t7 represents, the torque drop upon the gear shift is prevented by compensating the braking force corresponding to the decrease in the torque of the drive motor 111 by the second clutch 122, and the driver does not feel the sense of discomfort. Moreover, as the period from t2 to t6 represents, even when the transmission torque of the second clutch 122 becomes equal to or more than the cranking torque, due to the engine rpm 0 control by the internal combustion engine motor 112, the engine does not rotate.

As described above, according to the first embodiment, when the gear shift request of shifting the gear shift stage of the first transmission mechanism is made during the regeneration travel of the electrical power source, the control unit (step) controls the torque of at least one of the second clutch or the electric motor so as to compensate the decreased braking force upon the gear shift in the electrical power source.

Therefore, the torque drop to be caused upon the gear shift during the drive motor regeneration travel can be suppressed by means of the simple and inexpensive configuration.

Moreover, regardless of whether or not the second clutch is in the direct engagement state, the torque drop to be caused upon the gear shift can be suppressed, and, as a result, the driver does not feel the sense of discomfort.

Moreover, when the second clutch is in the direct engagement state, the control unit controls the torque (electric power generation torque) of the electric motor so as to compensate the braking force decreased upon the gear shift in the electrical power source with use of only the electric motor.

Therefore, the electric motor originally installed for the engine start can be used, and thus the cost does not increase.

Moreover, when the second clutch is not in the direct engagement state, the control unit controls the torque of each of the second clutch and the electric motor so as to compensate the braking force decreased upon the gear shift in the electrical power source with use of the second clutch and the electric motor.

Therefore, the torque drop is suppressed when the braking force by the electrical power source is so large as not to be addressed only by the torque adjustment by the second clutch.

Moreover, the control unit controls the torque of the electric motor so that the rpm of the electric motor is 0.

Therefore, even when a torque equal to or more than the cranking torque is necessary, the torque drop can be suppressed.

Moreover, the control unit short-circuits the current supply phases of the electric motor.

As a result, the torque drop can be suppressed without the power consumption of the electrical power source, resulting in a reduction in the cost.

Second Embodiment

According to the first embodiment, a description is given of the processing of adjusting the torque of each of the second clutch 122 and the internal combustion engine motor 112 to suppress the toque omission to be caused when the engine is stopped during the gear shift, and when the gear is shifted during the regeneration travel by the drive motor 111.

In contrast, according to a second embodiment of the present invention, a description is given of processing of adjusting the torque of each of the second clutch 122 and the internal combustion engine motor 112 to suppress the toque omission to be caused when the engine is rotated during the gear shift, and when the gear is shifted during the regeneration travel by the drive motor 111.

Figure 8:
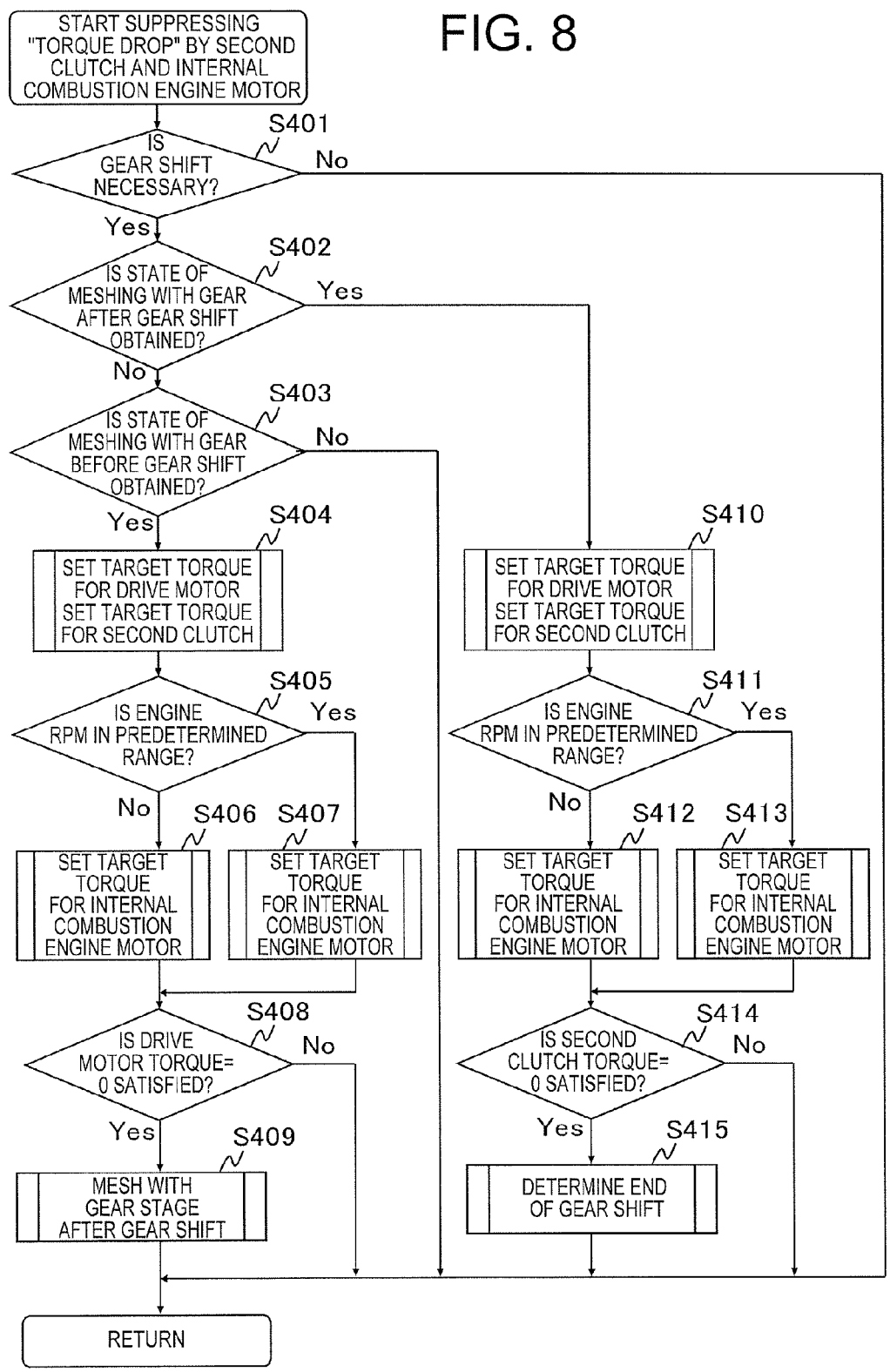
FIG. 8 is a flowchart for illustrating processing of adjusting a torque of each of a second clutch and an internal combustion engine motor to suppress a torque drop in a control device for a hybrid vehicle according to a second embodiment of the present invention.

Referring to a flowchart of FIG. 8, a description is now given of the processing (other processing in Step S104 of FIG. 3) of adjusting the torque of each of the second clutch 122 and the internal combustion engine motor 112 to suppress the torque drop to be caused when the engine is rotated during the gear shift, and when the gear is shifted during the regeneration travel by the drive motor 111. It should be noted that the flowchart of FIG. 8 is carried out, for example, at an interval of 10 milliseconds by the electronic control unit 101.

First, whether or not the gear shift is necessary is determined depending on vehicle states such as a vehicle speed (Step S401). On this occasion, this determination may be made by directly sensing the vehicle states or based on signals received by means of communication, which represent measurement results by other controllers (such as a TM controller).

When, in Step S401, it is determined that the gear shift is not necessary (that is, No), the processing of FIG. 8 is directly ended.

On the other hand, when, in Step S401, it is determined that the gear shift is necessary (that is, Yes), it is determined whether or not a state of meshing with a gear stage after the gear shift is obtained in the first transmission mechanism 130 (Step S402). On this occasion, this determination may be made based on a relationship between the motor rpm and the vehicle speed, or by acquiring information from other controllers.

When, in Step S402, it is determined that the state of meshing with the gear stage after the gear shift is not obtained (that is, No), it is determined whether or not a state of meshing with a gear stage before the gear shift is obtained in the first transmission mechanism 130 (Step S403). On this occasion, this determination may be made based on a relationship between the motor rpm and the vehicle speed, or by acquiring information from other controllers as in Step S402.

When, in Step S403, it is determined that the state of meshing with the gear stage before the gear shift is obtained (that is, Yes), the target torque of the drive motor 111 and the target torque of the second clutch 122 are set (Step S404).

Specifically, the torque of the drive motor 111 is reduced by a predetermined amount. Moreover, the transmission torque of the second clutch 122 is increased so as to compensate a braking force reduced by the reduction in the torque of the drive motor 111. It should be noted that a change period of the torque is such a period that the driver does not feel a sense of discomfort, which is acquired by experiments and the like. A change amount of the torque is represented by the following expressions.

$$\Delta Tm \times Gm = \Delta T2 \times G2$$

$$\Delta T2 = (\Delta Tm \times Gm) \div G2$$

$$T2(n) = \Delta T2 + T2(n-1)$$

In the above-mentioned expressions, $\Delta Tm$ denotes a change amount of the torque of the drive motor 111 per unit step processing, Gm denotes a gear ratio from the drive motor 111 to the drive wheels 190, $\Delta T2$ denotes a change amount of the transmission torque of the second clutch 122 per unit step processing, G2 denotes a gear ratio from the second input shaft 128 to the drive wheels 190, and T2(n) denotes a transmission torque after the change of the second clutch 122.

Then, whether or not the engine rpm is within a predetermined range is determined (Step S405). On this occasion, this determination is a determination on whether or not a resonance point of a vehicle body is avoided. It should be noted that the predetermined range of the engine rpm is determined by acquiring the resonance point of the vehicle body by means of experiments and the like.

When, in Step S405, it is determined that the engine rpm is not within the predetermined range (that is, No), a target torque for the internal combustion engine motor 112 is set as described below (Step S406). Specifically, there is no fear of the resonance of the vehicle body, and hence the torque of the internal combustion engine motor 112 is set to 0.

On the other hand, when, in Step S405, it is determined that the engine rpm is within the predetermined range (that is, Yes), the target torque for the internal combustion engine motor 112 is set as described below (Step S407). Specifically, in order to accelerate the rotation of the engine at a level that does not cause the driver to feel the sense of discomfort, which is acquired by experiments and the like, so as to pass the resonance point quickly, the assistance is provided by the torque of the internal combustion engine motor 112 as represented by the following expression.

$$Je \times dw/dt = T2 + Tbsg (dw/dt > 0)$$

In the expression above, Je denotes an engine inertia, w denotes the engine rpm, T2 denotes the torque of the second clutch 122, and Tbsg denotes the torque of the internal combustion engine motor 112.

Then, whether or not the torque of the drive motor 111 has become 0 is determined (Step S408).

When, in Step S408, it is determined that the torque of the drive motor 111 has become 0 (that is, Yes), the meshing with the gear stage before the gear shift is released, and the meshing with the gear stage after the gear shift is carried out by the synchronizer mechanisms 131e and 133e (Step S409), and the processing of FIG. 8 is ended.

On the other hand, when, in Step S403, it is determined that the state of meshing with the gear stage before the gear shift is not obtained (that is, No), and, when, in Step S408, it is determined that the torque of the drive motor 111 has not become 0 (that is, No), the processing of FIG. 8 is directly ended.

Further, on the other hand, when, in Step S402, it is determined that the state of meshing with the gear stage after the gear shift is obtained (that is, Yes), the target torque of the drive motor 111 and the target torque of the second clutch 122 are set (Step S410).

Specifically, the transmission torque of the second clutch 122 is reduced by a predetermined amount. Moreover, the torque of the drive motor 111 is increased so as to compensate a braking force reduced by the reduction in the transmission torque of the second clutch 122. It should be noted that a change period of the torque is such a period that the driver does not feel a sense of discomfort, which is acquired by experiments and the like. A change amount of the torque is represented by the following expressions.

$$\Delta Tm \times Gm = T2 \times G2$$

$$\Delta Tm = (\Delta T2 \times G2) \div Gm$$

$$Tm(n) = \Delta Tm + Tm(n-1)$$

In the above-mentioned expressions, ΔTm denotes a change amount of the torque of the drive motor 111 per unit step processing, Gm denotes a gear ratio from the drive motor 111 to the drive wheels 190, ΔT2 denotes a change amount of the transmission torque of the second clutch 122 per unit step processing, G2 denotes a gear ratio from the second input shaft 128 to the drive wheels 190, and Tm(n) denotes a torque after the change of the drive motor 111.

Then, whether or not the engine rpm is within a predetermined range is determined (Step S411). On this occasion, this determination is a determination on whether or not a resonance point of a vehicle body is avoided as in Step S405. It should be noted that the predetermined range of the engine rpm is determined by acquiring the resonance point of the vehicle body by means of experiments and the like.

When, in Step S411, it is determined that the engine rpm is not within the predetermined range (that is, No), a target torque for the internal combustion engine motor 112 is set as described below (Step S412). Specifically, there is no fear of the resonance of the vehicle body. Therefore, in order to slowly decelerate the engine so as not to cause the driver to feel the sense of discomfort, as represented by the following expression, the torque of the internal combustion engine motor 112 is added so as to cancel the transmission torque generated by the second clutch 122 and acting in a direction to accelerate the rotation of the engine, to thereby decrease the rpm of the engine.

$$Je \times dw/dt = T2 + Tbsg (dw/dt < 0)$$

In the expression above, Je denotes an engine inertia, w denotes the engine rpm, T2 denotes the torque of the second clutch 122, and Tbsg denotes the torque of the internal combustion engine motor 112.

On the other hand, when, in Step S411, it is determined that the engine rpm is within the predetermined range (that is, Yes), the target torque for the internal combustion engine motor 112 is set as described below (Step S413). Specifically, in order to decrease the rpm of the engine at a level that does not cause the driver to feel the sense of discomfort, which is acquired by experiments and the like, so as to pass the resonance point quickly, the assistance is provided by the torque of the internal combustion engine motor 112 as represented by the following expression.

$$Je \times dw/dt = T2 + Tbsg (dw/dt < 0)$$

In the expression above, Je denotes an engine inertia, w denotes the engine rpm, T2 denotes the torque of the second clutch 122, and Tbsg denotes the torque of the internal combustion engine motor 112.

Then, whether or not the transmission torque of the second clutch 122 has become 0 is determined (Step S414).

When, in Step S414, it is determined that the transmission torque of the second clutch 122 has not become 0 (that is, No), the processing of FIG. 8 is directly ended.

On the other hand, when, in Step S414, it is determined that the transmission torque of the second clutch 122 has become 0 (that is, Yes), it is determined that the gear shift has ended, and a signal representing the gear shift end is output (Step S415). Then, the processing of FIG. 8 is ended.

Figure 9:
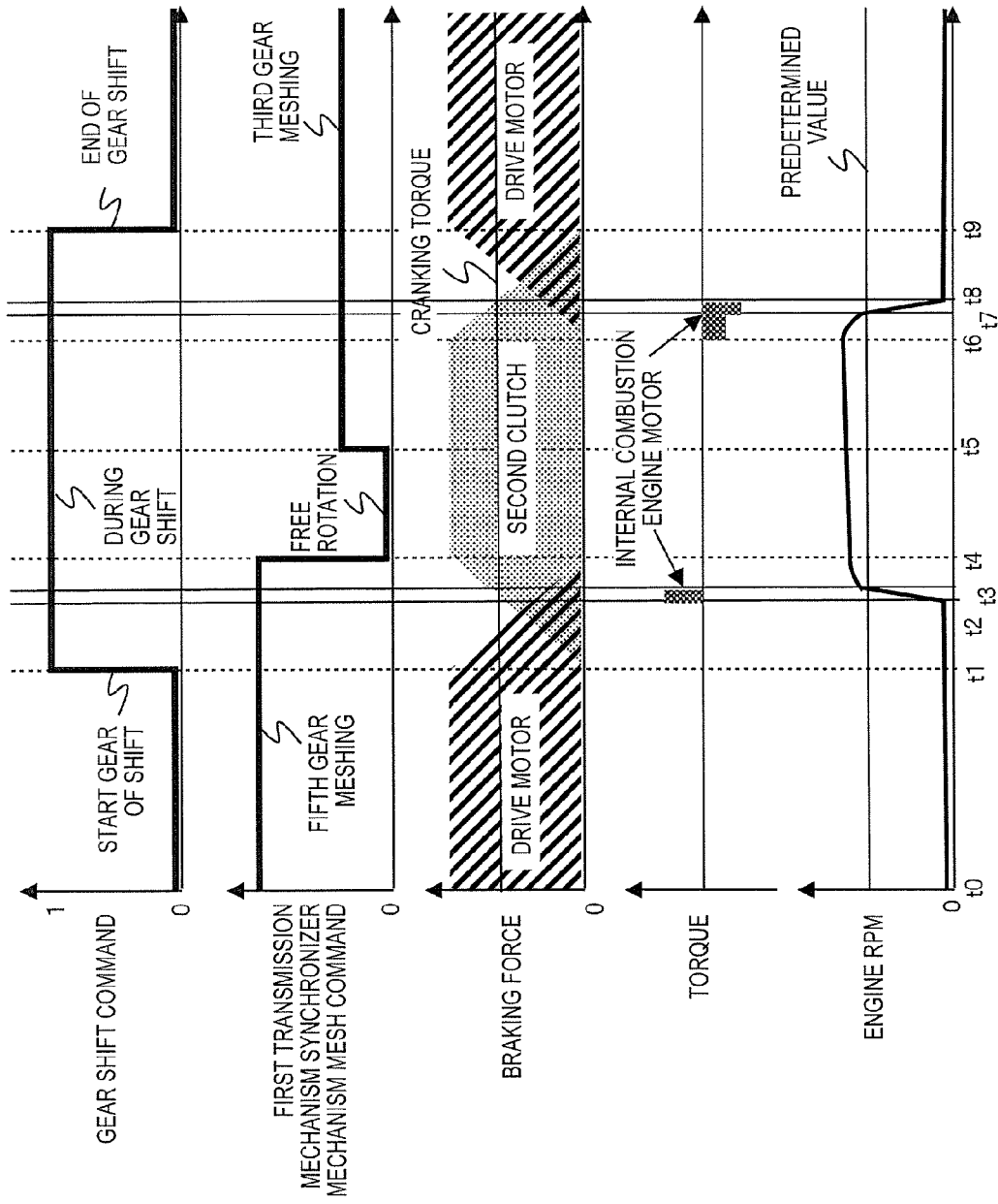
FIG. 9 is a timing chart for illustrating a result of the processing of adjusting the torque of each of the second clutch and the internal combustion engine motor to suppress the torque drop in the control device for a hybrid vehicle according to the second embodiment of the present invention.

Referring to a timing chart of FIG. 9, a description is now given of a result of the processing (the processing of FIG. 8) of adjusting the torque of each of the second clutch 122 and the internal combustion engine motor 112 to suppress the torque drop to be caused when the engine is rotated during the gear shift, and when the gear is shifted during the regeneration travel by the drive motor 111. In FIG. 9, a time sequence when the fifth gear is shifted to the third gear in the first transmission mechanism 130 is illustrated.

In FIG. 9, a first row is a graph for showing whether or not the gear is being shifted. On this occasion, a rise from 0 to 1 represents a gear shift start point and a fall from 1 to 0 represents a gear shift end point. Moreover, a second row is a graph for showing an operation of the synchronizer mechanisms 131e and 133e for meshing the fifth gear and the third gear of the first transmission mechanism 130.

A third row is a graph for showing the braking forces applied to the vehicle. There are shown two braking forces including the braking force generated by the drive motor 111 and the braking force generated by the second clutch 122. It should be noted that the braking force applied to the vehicle is a sum of the two braking forces and an engine friction (not shown).

A fourth row is a graph for showing the torque of the internal combustion engine motor 112. An upward direction of a vertical axis represents a torque in a direction of promoting the rotation of the engine by using the braking force of the second clutch 122, and a downward direction thereof represents a torque in a direction of suppressing the rotation of the engine.

A fifth row is a graph for showing the engine rpm. On this occasion, the predetermined value is an engine rpm representing that, when the rpm exceeds this predetermined value, it is determined that the resonance point of the vehicle body acquired by experiments and the like is passed.

In FIG. 9, a period from t0 to t1 represents a period in which the drive motor 111 is driven for the regeneration to generate the braking force. Moreover, the timing t1 is a timing at which it is determined that the gear shift is necessary based on the vehicle information such as the vehicle speed.

A period from t1 to t4 is a period in which the torque of the drive motor 111 is gradually changed to 0 in order for the gear shift. On this occasion, the decreased amount of the braking force by the torque of the drive motor 111 is compensated by the transmission torque of the second clutch 122. On this occasion, the change amounts and the change periods of the torques are the values described in Step S404 of FIG. 8.

It should be noted that the timing t2 is a timing at which the transmission torque of the second clutch 122 reaches the cranking torque, and the engine starts rotating. Moreover, in a period from t2 to t3, the transmission torque of the second clutch 122 can be set by controlling a pressing force of the clutch.

As a result of the setting of the transmission torque of the second clutch 122, the torque is transmitted to the engine, and the engine rpm increases. Moreover, this period corresponds to an area in which the resonance of the vehicle body is excited by the engine, and, in order to increase the engine rpm to be equal to or more than the resonance point of the vehicle body as fast as possible, the rotation of the engine is accelerated by the internal combustion engine motor 112 as represented by the following expression.

$$Je \times dw/dt = T2 + Tbsg \,(dw/dt > 0)$$

In the expression above, Je denotes an engine inertia, w denotes the engine rpm, T2 denotes the torque of the second clutch 122, and Tbsg denotes the torque of the internal combustion engine motor 112.

Then, the timing t3 is a timing at which the engine rpm exceeds the predetermined value. When the engine rpm has exceeded the predetermined value, the engine rpm is determined to have passed the resonance point of the vehicle body, and the assistance by the internal combustion engine motor 112 is stopped as represented by the following expression.

$$Je \times dw/dt = T2 \,(dw/dt > 0)$$

In the expression above, Je denotes an engine inertia, w denotes the engine rpm, and T2 denotes the torque of the second clutch 122.

A period from t3 to t4 is a period of an increase in the engine rpm by the transmission torque of the second clutch 122, and the torque transmitted from the second clutch 122 is used to increase the rpm of the engine.

Then, the timing t4 is a timing at which the torque of the drive motor 111 becomes 0. At the timing t4, the state in which the torque of the drive motor 111 is 0 is confirmed, and the release of the meshing with the fifth gear is started. Moreover, a period from t4 to t5 is a period in which the gear is switched by the synchronizer mechanisms 131e and 133e, and the meshing with the fifth gear is being released.

The timing t5 is a timing at which the release of the meshing with the fifth gear is confirmed, and the meshing with the third gear is started. Moreover, a period from t5 to t6 is a period in which the gear is switched by the synchronizer mechanisms 131e and 133e, and the meshing with the third gear is being carried out.

The timing t6 is a timing at which the meshing with the third gear is confirmed. Moreover, a period from t6 to t9 is a period in which the transmission torque generated by the second clutch 122 is gradually changed to 0. On this occasion, a decreased amount of the braking force by the transmission torque of the second clutch 122 is compensated by the torque of the drive motor 111. On this occasion, the change amounts and the change periods of the torques are the values described in Step S410 of FIG. 8.

Then, in a period from t6 to t7, in order to cancel the transmission torque generated by the second clutch 122 and acting in the direction to accelerate the rotation of the engine, as represented by the following expression, the torque of the internal combustion engine motor 112 is added, to thereby decrease the rpm of the engine.

$$Je \times dw/dt = T2 + Tbsg \,(dw/dt < 0)$$

In the expression above, Je denotes an engine inertia, w denotes the engine rpm, T2 denotes the torque of the second clutch 122, and Tbsg denotes the torque of the internal combustion engine motor 112.

Then, the timing t7 is a timing at which the engine rpm reaches a value equal to or less than the predetermined value. Moreover, a period from t7 to t8 corresponds to an area in which the resonance of the vehicle body is excited by the engine. Therefore, in order to stop the engine as soon as possible, the engine is stopped by using the internal combustion engine motor 112 as represented by the following expression.

$$Je \times dw/dt = T2 + Tbsg \,(dw/dt < 0)$$

In the expression above, Je denotes an engine inertia, w denotes the engine rpm, T2 denotes the torque of the second clutch 122, and Tbsg denotes the torque of the internal combustion engine motor 112.

Then, the timing t8 is a timing at which the transmission torque of the second clutch 122 decreases below the cranking torque, and the engine stops. Moreover, the timing t9 is a timing at which the transmission torque of the second clutch 122 becomes 0, and it is determined that the gear shift has completed.

As the period from t1 to t9 represents, the torque drop upon the gear shift is prevented by compensating the braking force corresponding to the decrease in the torque of the drive motor 111 by the second clutch 122, and the driver does not feel the sense of discomfort. Moreover, as the period from t2 to t3 and the period from t7 to t8 represent, by quickly passing through the area in which the resonance of the vehicle body is excited by the engine by means of the torque assistance by the internal combustion engine motor 112, a period in which the driver feels the sense of discomfort due to the resonance can be reduced.

As described above, according to the second embodiment, when the rpm of the mechanical power source is within the predetermined range, the control unit uses the electric motor to accelerate or decelerate the rpm of the mechanical power source.

As a result, the period of staying in the neighborhood of the resonance rpm of the mechanical power source can be reduced, and thus the period in which the driver feels the sense of discomfort can be reduced.

The invention claimed is:

1. A control device for a hybrid vehicle, comprising:
a mechanical power source;
an electric motor to be used when the mechanical power source is started;
a first clutch arranged between the mechanical power source and a first transmission mechanism including a plurality of gear shift stages, for transmitting power of the mechanical power source to the first transmission mechanism or shutting off the transmission;
a second clutch arranged between the mechanical power source and a second transmission mechanism including a plurality of gear shift stages, for transmitting the power of the mechanical power source to the second transmission mechanism or shutting off the transmission;
an electrical power source coupled to an input shaft of the first transmission mechanism, and capable of carrying out regenerative driving; and
a controller which controls a torque of at least one of the second clutch or the electric motor so as to compensate a braking force decreased upon a gear shift in the electrical power source when a gear shift request for shifting the gear shift stage of the first transmission mechanism is made during a regeneration travel of the electrical power source,
wherein, during the regeneration travel of the electrical power source, the controller determines whether the second clutch is in an engagement state and based on the determination, the controller compensates for the torque of the second clutch and the torque of the electric motor or for the torque of the electric motor only.

2. The control device for the hybrid vehicle according to claim 1, wherein, when the controller determines that the second clutch is in the engagement state, the controller controls the torque of the electric motor so as to compensate the braking force decreased upon the gear shift in the electrical power source with use of only the electric motor.

3. The control device for the hybrid vehicle according to claim 2, wherein the controller controls an electric power generation torque of the electric motor.

4. The control device for the hybrid vehicle according to claim 3, wherein the controller uses, when an rpm of the mechanical power source is within a predetermined range, the electric motor to accelerate or decelerate rotation of the mechanical power source.

5. The control device for the hybrid vehicle according to claim 2, wherein the controller uses, when an rpm of the mechanical power source is within a predetermined range, the electric motor to accelerate or decelerate rotation of the mechanical power source.

6. The control device for the hybrid vehicle according to claim 1, wherein, when the controller determines that the second clutch is not in the engagement state, the controller compensates for the torque of the second clutch and the torque of the electric motor so as to compensate the braking force decreased upon the gear shift in the electrical power source by engaging the second clutch and the electric motor.

7. The control device for the hybrid vehicle according to claim 6, wherein the controller controls the torque of the electric motor so that an rpm of the electric motor is 0.

8. The control device for the hybrid vehicle according to claim 7, wherein the controller uses, when an rpm of the mechanical power source is within a predetermined range, the electric motor to accelerate or decelerate rotation of the mechanical power source.

9. The control device for the hybrid vehicle according to claim 7, wherein the controller short-circuits a current supply phase of the electric motor.

10. The control device for the hybrid vehicle according to claim 9, wherein the controller uses, when an rpm of the mechanical power source is within a predetermined range, the electric motor to accelerate or decelerate rotation of the mechanical power source.

11. The control device for the hybrid vehicle according to claim 6, wherein the controller uses, when an rpm of the mechanical power source is within a predetermined range, the electric motor to accelerate or decelerate rotation of the mechanical power source.

12. The control device for the hybrid vehicle according to claim 1, wherein the controller uses, when an rpm of the mechanical power source is within a predetermined range, the electric motor to accelerate or decelerate rotation of the mechanical power source.

13. A control method for a hybrid vehicle, which is to be carried out by a control device for a hybrid vehicle comprising:
a mechanical power source;
an electric motor to be used when the mechanical power source is started;
a first clutch arranged between the mechanical power source and a first transmission mechanism including a plurality of gear shift stages, for transmitting power of the mechanical power source to the first transmission mechanism or shutting off the transmission;
a second clutch arranged between the mechanical power source and a second transmission mechanism including a plurality of gear shift stages, for transmitting the power of the mechanical power source to the second transmission mechanism or shutting off the transmission; and
an electrical power source coupled to an input shaft of the first transmission mechanism, and capable of carrying out regenerative driving,
the control method comprising:
determining whether or not a gear shift request for shifting the gear shift stage of the first transmission mechanism is made during a regeneration travel of the electrical power source; and
controlling a torque of at least one of the second clutch or the electric motor so as to compensate a braking force decreased upon a gear shift in the electrical power source when the gear shift request is made, wherein, during the regeneration travel of the electrical power source, based on the determining, compensating for the torque of the second clutch and the torque of the electric motor or for the torque of the electric motor only.

14. The control method for the hybrid vehicle according to claim 13, further comprising:
in response to the determining that the gear shift request is made, determining whether a state of meshing with a gear after the gear shift, is obtained, and
based on the determining, setting a target torque for the electric motor and for the second clutch.

15. The control method for the hybrid vehicle according to claim 13, further comprising:
in response to the determining that the gear shift request is made, determining whether a state of meshing with a gear after the gear shift, is obtained;
based on the determining that the state of the meshing with the gear after the gear shift, is obtained, setting the torque for the electric motor and the torque for the second clutch; and
based on the determining that the state of the meshing with the gear after the gear shift is not obtained, determining if the state of the meshing with the gear before the gear shift, is obtained.

* * * * *